United States Patent Office

3,367,896
Patented Feb. 6, 1968

3,367,896
SCUFF RESISTANT INKS COMPRISING DRYING OIL AND ETHYLENE-VINYL ACETATE COPOLYMER
Robert Rosenbaum, Morris Plains, and Joseph I. Wrozina, Tenafly, N.J., assignors to Allied Chemical Corporation, New York, N.Y., a corporation of New York
No Drawing. Filed Sept. 29, 1964, Ser. No. 400,235
5 Claims. (Cl. 260—23)

ABSTRACT OF THE DISCLOSURE

Ethylene/vinyl acetate copolymer dispersion in drying oil and process for incorporating said dispersion into drying oil ink vehicles by heat blending without roller milling, to provide inks of enhanced scuff resistance.

---

This invention relates to drying oil inks adapted for imprinting by planographic, cylinder press or other suitable printing processes, and especially to inks which are capable of producing printed impressions which are highly resistant to scuffing and marring when the printed specimen is subjected to wear or abrasion in use.

Ink imprinted papers and paper board, particularly when used in labeling and packaging, are often subjected to scuffing and abrasion both in the packaging machine and in storage and handling after fabrication.

It has been the practice in the past to reduce the damage to such printed surfaces by incorporating small proportions of waxes or wax-like materials into the inks to improve scuff resistance. When petroleum waxes are used as such additives, they are usually incorporated into the ink by melting the wax and adding the molten wax to the ink mill or mixer during the course of dispersing the pigment in the vehicle, which may be drying oil alone, or mixtures of drying oil and resin combinations, or may be organic solvents, such as toluene. The petroleum waxes, while imparting some scuff resistance to the resulting ink, were not as efficacious in this respect as desired.

Recently it was found that low molecular weight polyethylene of about 1000 to about 5000 average molecular weight, is capable of imparting enhanced scuff resistance when incorporated in an ink vehicle. The polyethylenes, however, because of their higher viscosities and melting points, cannot readily be incorporated into the inks from the molten state and thus required preliminary dispersion in a hot oil or solvent. This procedure is satisfactory in the case of gravure inks which are solvent dispersed, and the polyethylene readily dissolves in the ink vehicle. In the drying oil inks, on the other hand, compatibility of low molecular weight polyethylene is poor, and on cooling, a coarse, grainy structure is obtained. In order to incorporate this polyethylene-solvent mixture into the drying oil base ink, further milling on the ink rolls is required to obtain a satisfactorily smooth dispersion. This extra step is not only expensive, but is impracticible in the case of many inks.

We have now found that if a normally solid, low molecular weight ethylene/vinyl acetate copolymer of the characteristics specified hereinafter is dispersed in a drying oil at temperatures above the softening point of the copolymer, and the resulting dispersion is cooled, it forms a homogeneous, non-grainy gel which can readily be dispersed in a drying oil ink vehicle or pigmented ink by simple agitation without resorting to milling.

Preparation of the ethylene/vinyl acetate-drying oil gel may be effected in any suitable manner which provides for incorporation of the solid ethylene/vinyl acetate copolymer in the drying oil and its dispersion therein at elevated temperatures above the softening point of the ethylene/vinyl acetate copolymer. In one modification, solid ethylene/vinyl acetate copolymer, suitably in pellet form, is added to the fluid linseed oil, with stirring. The drying oil may be heated before addition of the copolymer, for example to between about 90° C. and about 130° C., or the drying oil may be at ambient temperatures during the incorporation of the copolymer in which case the mixture will then be heated with agitation, to disperse the copolymer. Agitation is continued until the copolymer is thoroughly dispersed, usually between about 2 minutes and about 10 minutes, then heating is discontinued and agitation is continued while cooling the mixture to about 50° C. or less. In another modification, the solid ethylene/vinyl acetate is added to the bodied drying oil after completion of the heat bodying, and dispersion is effected with agitation while the bodied oil is cooling from its bodying temperature, for example 300–310° C. After dispersion, a homogeneous, grain-free gel results, whose consistency can be varied somewhat by rate of cooling and by proportions of copolymer used. Faster cooling results in stiffer, less fluid gels than does slow cooling. Higher proportions of copolymer produce gels which are somewhat wax-like in character. Dispersions containing up to about 50% ethylene/vinyl acetate copolymer are satisfactory. Preferably proportions between about 15% and about 40% are used.

The ethylene/vinyl acetate-drying oil dispersions prepared as described above are mixed with drying oil base inks by simply pouring or cutting in, a suitable amount of dispersion to yield the desired proportion in the finished ink, and agitating the ink until the dispersion is thoroughly blended in the ink, gentle heating being applied if desired. Proportions of ethylene/vinyl acetate copolymer based on the total weight of the ink may suitably range between about 2% and about 5% to afford good scuff resistance in the ultimately imprinted ink.

The low molecular weight ethylene/vinyl acetate copolymers suitable for use in our invention have average molecular weights between about 1000 and about 5000, as determined according to the method described by J. J. Newmayer in Analytica Chimica Acta, vol. 20 (1959), pages 519–523. They have inherent viscosities as determined on a 0.25% solution of the copolymer in toluene at 30° C., below about 0.3, usually between about 0.10 and about 0.30. They contain between about 10% and about 20% vinyl acetate; they have softening points Ring and Ball between about 190° F. and about 210° F. (ca 88°–99° C.), kinematic viscosities, Brookfield, between about 50 and about 600 centipoises at 300° F. and melt indexes above about 2000 (A.S.T.M. D–1238). Especially suitable are ethylene/vinyl acetate copolymers of average molecular weight between about 3000 and about 4000, and vinyl acetate content between about 15% and about 18%.

The ethylene/vinyl acetate copolymer-drying oil gel can be blended with any drying oil base pigmented ink or ink vehicle. Such inks are conventional and will contain the conventional components including drying oils such as raw and bodied linseed oil, soyabean oil, safflower oil, oiticica oil, tung oil, dehydrated castor oil, etc. or mixtures of such oils. The ink can be one of solely drying oil vehicle or it may be an oleoresinous vehicle containing the usual resins including especially the oil modified alkyd type resins. Finished pigmented inks also blend readily with the ethylene/vinyl acetate gels of our invention and may contain any of the usual ink pigments and toners.

The following specific examples further illustrate our invention. Parts are by weight except as otherwise noted.

*Example 1*

Two hundred forty parts of unbodied linseed oil were heated to 90° C., then to the hot oil were added with agitation 60 parts of an ethylene/vinyl acetate copolymer having an average molecular weight between about 3,000 and about 4,000 a melt index above 2,000 and having a vinyl acetate content of about 18%, thus producing a mixture containing 20% ethylene/vinyl acetate copolymer. Heating and agitation were continued until the mixture was clear. The mixture was quickly cooled, i.e. at about 5 degrees C. per minute in a cold water bath (ca 20° C.) and agitation was continued until the temperature of mixture reached 40° C. The resulting gel appeared homogeneous and was smooth and fairly stiff with no evidence of graining or of crystals or gel lumps. Examination of the dispersion under the microscope disclosed uniform needle-like particles of very small particle size. The gel dispersed readily in a drying oil ink without milling.

When the above procedure was repeated except that 60 parts of a low molecular weight ethylene homopolymer of about 2,000 molecular weight was added to the linseed oil in place of the copolymer, the resulting cooled gel was non-homogeneous and contained large masses of grains. When examined microscopically at 40× magnification, the grain particles were shown to be about 4 to 5 times as large as those from the ethylene/vinyl acetate copolymer-linseed oil mixture. When the polyethylene gel was added to a drying oil ink, additional milling was required to produce a smooth dispersion.

*Example 2*

The procedure of Example 1 was repeated except that the blended mixtures were cooled more slowly, i.e. at about 0.75° C. per minute. The linseed oil-ethylene/vinyl acetate copolymer mixture was considerably more fluid than that of Example 1, but was similarly homogeneous and non-grainy. A mixture containing an ethylene homopolymer similarly prepared was non-homogeneous and grainy.

*Example 3*

Two hundred forty parts of a heavy-bodied linseed oil whose Gardner Holdt viscosity was Z6+1, were heated to 120° C., then 60 parts of ethylene/vinyl acetate copolymer of the same character as that used in Example 1 were added with stirring, producing a mixture containing 20% ethylene/vinyl acetate copolymer. The heat was removed and the mixture was allowed to cool to 50° C. with continued stirring. The resulting mixture was a stiff gel which was homogeneous and non-grainy and appeared to be crystal free. It blended readily with a drying oil ink without milling.

A mixture similarly prepared except that a low molecular weight (ca 2,000) polyethylene was used instead of the ethylene/vinyl acetate copolymer resulted in a non-homogeneous, grainy gel and required milling to incorporate it into a drying oil ink.

*Example 4*

One hundred eighty parts of an unbodied linseed oil were heated to 90° C., then 120 parts of an ethylene/vinyl acetate copolymer of the character used in Example 1 were added with stirring, thus producing a mixture containing 40% ethylene/vinyl acetate copolymer. The temperature of the mixture was increased to 100° C. with continued stirring. The heat was then removed, and the mixture was allowed to cool to 50° C. The resulting mixture was a soft-waxy, non-grainy mass which could easily be spread, and readily incorporated smoothly into a drying oil ink without milling.

A mixture similarly prepared except that a low molecular weight (ca 2,000) polyethylene was used instead of the ethylene/vinyl acetate copolymer resulted in a non-homogeneous, grainy gel which required milling to incorporate it smoothly in a drying oil ink.

*Example 5*

In a manner similar to that described in Example 1, gels were made containing 20% and 40% of ethylene/vinyl acetate copolymer of the character described in Example 1, dispersed respectively in Safflower oil, soybean oil and dehydrated castor oil. All the gels were non-grainy and appeared crystal free. All were readily dispersable in drying oil inks without additional milling.

*Example 6*

Inks were prepared by thoroughly blending small proportions of two linseed oil-ethylene/vinyl acetate copolymer dispersions prepared as described in Examples 1 and 4 and containing 16.6% and 40% of copolymer respectively with an offset ink of the following composition

|  | Percent |
|---|---|
| Blown linseed oil | 75 |
| Driers | 5 |
| Red pigment | 20 | producing ink compositions containing 1% and 2.5% respectively of ethylene/vinyl acetate copolymer. A similar ink was prepared as a standard containing a low molecular weight ethylene polymer and considered to have satisfactory scuff resistance. The absence of graininess in the ethylene/vinyl acetate copolymer dispersions permitted their rapid blending with the inks without milling. That made with the polyethylene homopolymer required milling to thoroughly incorporate it.

The resulting inks were printed on white label stock paper and allowed to dry for eight days. The prints were then tested on a Sutherland Rub Tester wherein non-printed paper of the same character as the printed stock was weighted and rubbed against the printed area, thus rubbing paper against printed paper under varying weights and varying numbers of rubs. After the rubbing tests, the printed samples were examined for severity of scuffing as indicated by amount of scratching or marring of the printed sheet and amount of ink transferred to the non-printed sheet. Results of the rubbing tests indicated that inks made with the ethylene/vinyl acetate copolymer had scuff resistances equal to or better than the standard ink containing the ethylene homopolymer.

While the above describes the preferred embodiments of our invention, it will be understood that departures can be made therefrom within the scope of the specification and claims.

We claim:

1. A composition adapted for incorporation into a drying oil ink to impart scuff resistance thereto consisting essentially of a homogeneous grain-free dispersion of between about 15% and about 50% of a normally solid ethylene/vinyl acetate copolymer of average molecular weight between about 1,000 and about 5,000 and vinyl acetate content between about 10% and about 20% dispersed in a fatty drying oil.

2. The process for preparing a composition adapted for incorporation into a drying oil ink to impart scuff resistance thereto which comprises adding to a fatty drying oil between about 15 parts and about 50 parts per 100 parts of final composition of a normally solid ethylene/vinyl acetate copolymer having an average molecular weight between about 1,000 and about 5,000 and vinyl acetate content between about 10% and about 20%, agitating the mixture at a temperature above the softening point of the copolymer until the copolymer is thoroughly dispersed in the drying oil, and cooling the resulting dispersion while continuing the agitation, to a temperature of at least as low as about 50° C. whereby a homogeneous non-grainy gel is produced.

3. The process according to claim 3 wherein the drying oil is linseed oil.

4. A printing ink comprising a vehicle selected from the group consisting of fatty drying oil vehicles and oleoresinous vehicles, said ink having homogeneously dispersed therein between about 2% and about 5% by weight based on the weight of the ink, of a normally solid ethylene/vinyl acetate copolymer of average molecular weight between about 1,000 and about 5,000 and vinyl acetate content between about 10% and about 20%.

5. The process for preparing a scuff resistant printing ink which comprises adding to a fatty drying oil-containing printing ink a proportion sufficient to provide between about 2% and about 5% ethylene/vinyl acetate copolymer in the final printing ink, of a homogeneous, non-grainy gel-like dispersion of ethylene/vinyl acetate copolymer in a fatty drying oil, prepared by incorporating in a drying oil at a temperature above about 90° C. between about 15 parts and about 50 parts per 100 parts of final composition of a normally solid ethylene/vinyl acetate copolymer having an average molecular weight between about 1,000 and about 5,000 and vinyl acetate content between about 10% and about 20%, maintaining the mixture at the above mentioned temperature with agitation until the copolymer is thoroughly dispersed in the drying oil, and cooling the resulting dispersion while continuing the agitation, to a temperature of at least as low as about 50° C. whereby a homogeneous non-grainy gel is produced, and agitating said ink until the copolymer is uniformly dispersed in the ink.

References Cited

UNITED STATES PATENTS

| | | | |
|---|---|---|---|
| 3,314,813 | 4/1967 | Maxion | 117—12 |
| 2,762,712 | 9/1956 | Bloch et al. | 106—28 |
| 3,159,608 | 12/1964 | Ilnyckyz | 260—87.3 |

FOREIGN PATENTS 699,513  11/1953  Great Britain.

OTHER REFERENCES

Du Pont Bulletin, "Elvax Vinyl Resins," Pl 9–464, Table IV.

Apps, "Printing Ink Technology," 1958, p. 89, TP 949 A6 C2.

DONALD E. CZAJA, *Primary Examiner.*

LEON J. BERCOVITZ, *Examiner.*

R. A. WHITE, *Assistant Examiner.*

UNITED STATES PATENT OFFICE
CERTIFICATE OF CORRECTION

Patent No. 3,367,896                                      February 6, 1968

Robert Rosenbaum et al.

It is hereby certified that error appears in the above numbered patent requiring correction and that the said Letters Patent should read as corrected below.

Column 4, line 71, for the claim reference numeral "3" read -- 2 --.

Signed and sealed this 22nd day of April 1969.

(SEAL)
Attest:

Edward M. Fletcher, Jr.                                      EDWARD J. BRENNER
Attesting Officer                                                 Commissioner of Patents